United States Patent [19]

Krupp et al.

[11] 4,209,833
[45] * Jun. 24, 1980

[54] ELECTRONIC CONTROL SYSTEM

[75] Inventors: David M. Krupp, Mountain View; Robert B. Hood, Los Altos, both of Calif.

[73] Assignee: Fairchild Camera and Instrument Corporation, Mountain View, Calif.

[*] Notice: The portion of the term of this patent subsequent to Jul. 8, 1992, has been disclaimed.

[21] Appl. No.: 530,319

[22] Filed: Dec. 6, 1974

Related U.S. Application Data

[62] Division of Ser. No. 213,905, Dec. 30, 1971, Pat. No. 3,893,432.

[51] Int. Cl.² ............................ H03K 3/86; F02B 3/00
[52] U.S. Cl. .............................. 364/569; 123/32 EA; 123/32 EC; 123/117 D; 364/431
[58] Field of Search .................. 132/32 EA; 364/442, 364/431, 569, 424; 307/293

[56] References Cited

U.S. PATENT DOCUMENTS

| 3,070,301 | 12/1962 | Sarnoff | 369/442 |
|---|---|---|---|
| 3,643,635 | 2/1972 | Milam | 123/32 EA |
| 3,645,240 | 2/1972 | Monpetit | 123/32 EA |
| 3,692,003 | 9/1972 | Wakamatsu et al. | 123/32 EA |
| 3,766,367 | 10/1973 | Sumiyoshi et al. | 364/424 |
| 3,780,711 | 12/1973 | Lindberg | 123/32 EC |

*Primary Examiner*—Felix D. Gruber
*Attorney, Agent, or Firm*—Alan H. MacPherson; Ronald J. Meetin; Paul J. Winters

[57] ABSTRACT

An electronic control system for controlling the duration of operation of repetitively activated equipment produces a control signal from input signals representing the values of parameters related to the duration of operation. Timing signals generated from repetitive signals produced by the equipment are digitally shifted through a delay line at a rate determined by the control signal to establish the duration of operation of the repetitively activated equipment. The equipment may include a plurality of repetitively activated mechanisms, such as fuel injectors, which are sequentially selected and activated for the specified duration of operation.

5 Claims, 18 Drawing Figures

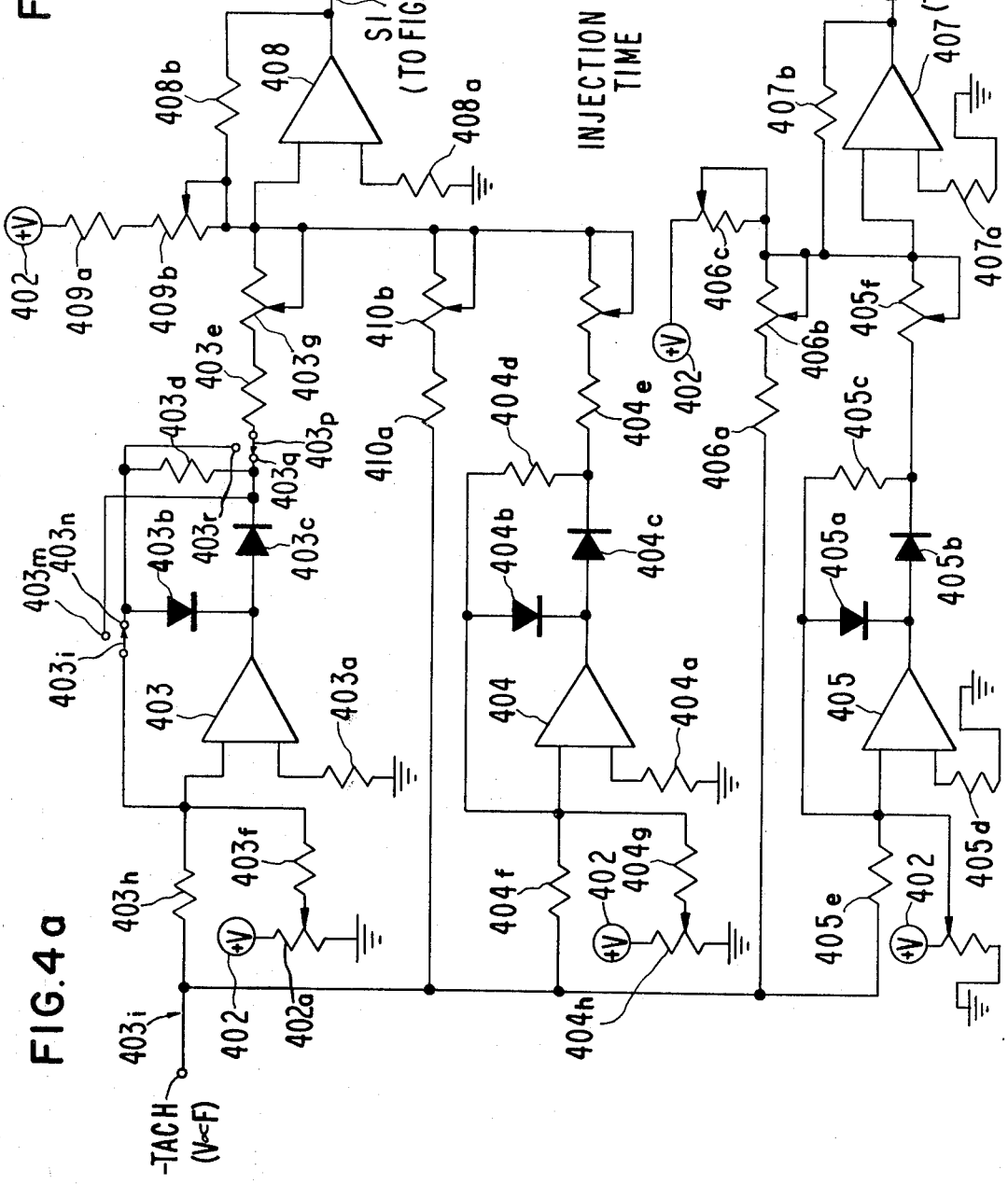

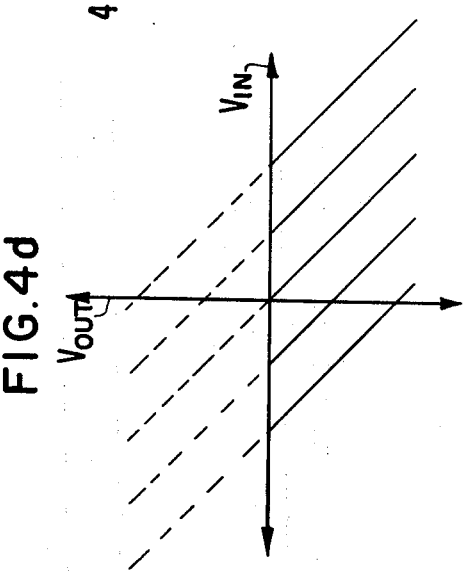

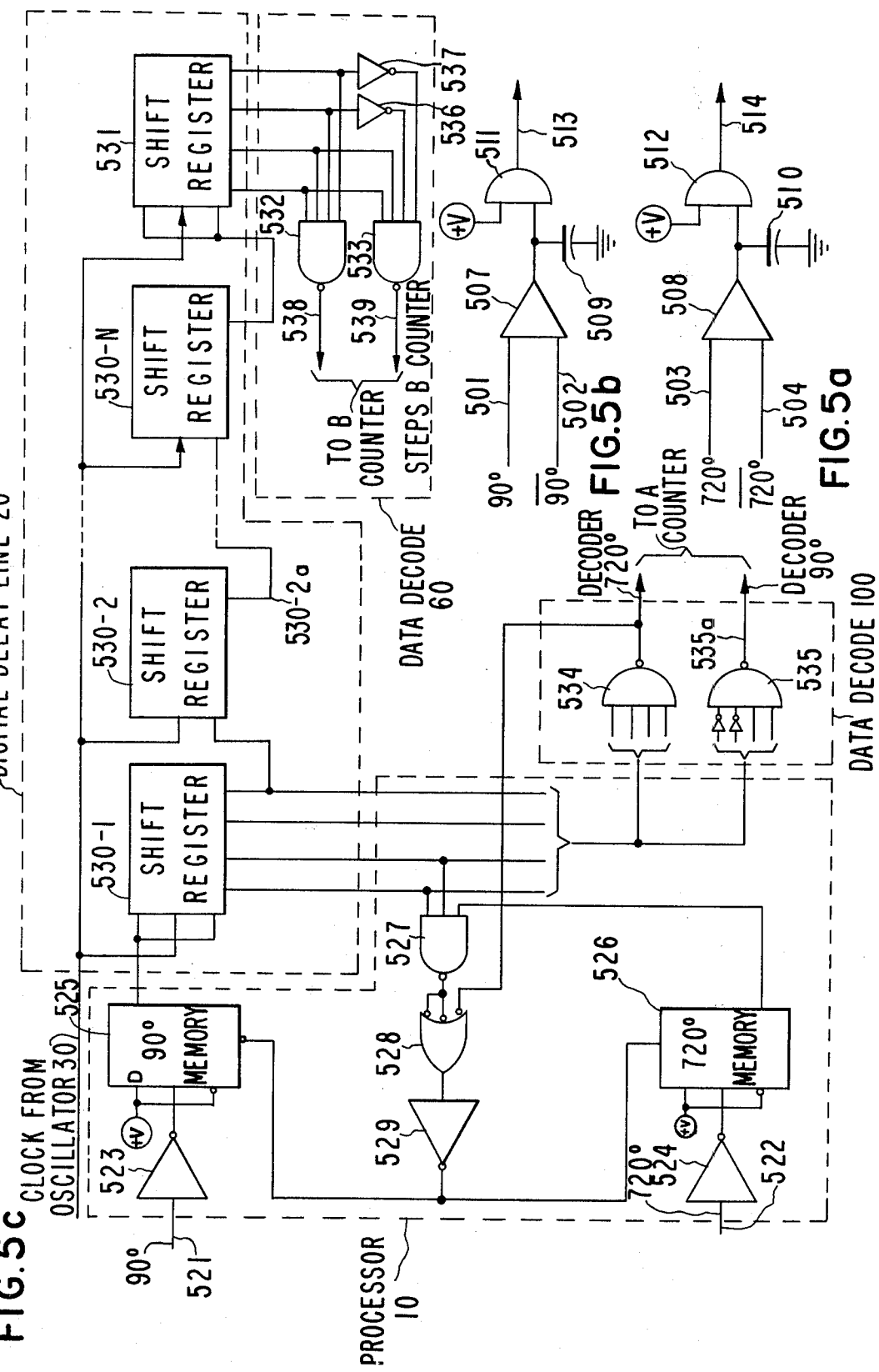

ELECTRONIC CONTROL SYSTEM

CROSS REFERENCE TO RELATED CASE

This application is a division of application Ser. No. 213,905 filed Dec. 30, 1971 on an invention of David M. Krupp and Robert B. Hood entitled "Electronic Control System," now U.S. Pat. No. 3,893,432.

BACKGROUND OF THE INVENTION

1. Field of the Invention

This invention relates to an electronic control system and in particular to an electronic control system for use with an injection system. The electronic control system described in this specification is particularly suitable for use with fuel injectors for automobile engines. However, the described system can also be used to control any repetitively activated equipment where the time of activation depends on measurable variables.

2. Description of the Prior Art

Numerous control systems have been proposed for fuel injectors. In general, fuel injection control systems respond to selected input parameters from an engine to determine the amount of fuel to be injected into each cylinder. Typical prior art systems have several disadvantages. Among these are the fact that these systems use a large number of discrete electronic components and thus often are bulkier than desirable. In addition, these systems usually determine the amount of fuel required by each cylinder by approximate techniques of insufficient accuracy to comply with present and projected stringent air pollution standards. Often fuel is not injected into each cylinder at the optimum time for injection, but rather is injected simultaneously into the manifold sections adjacent groups of cylinders. Other problems associated with these systems include a lack of reliability and responsiveness.

SUMMARY OF THE INVENTION

The fuel injection control system of this invention automatically adjusts the fuel required for each cylinder according to the manifold and atmospheric pressures, inlet air temperature, cylinder head temperature, fuel temperature, engine speed, battery voltage, throttle setting, and other selected inputs. Among these other inputs are signals indicating a wide open throttle or a fully closed throttle, and other factors affecting fuel consumption.

According to this invention, an electronic control for a fuel injection system comprises means for sensing the values of a plurality of parameters which determine the amount of fuel to be placed in each cylinder and for producing a plurality of input signals representing these values, means for operating on these input signals to determine the injection time necessary to inject the required amount of fuel into each cylinder, and means responsive to the injection time for producing control signals for controlling the opening and closing of a fuel injector associated with each cylinder.

In one embodiment, the means for converting the values of the input parameters into input signals representing the amount of fuel required by each cylinder comprises a plurality of amplifier means the gains of which are varied according to the values of the input signals. The output signals from these amplifier means are used to control the frequency of the output signal from an oscillator—sometimes called a "computing oscillator". Pulses are driven through a delay line at a shift frequency determined by the frequency of the output signal from the oscillator. As the frequency of the oscillator output signal increases, the shift frequency of the pulses through the delay line increases and vice versa. The time necessary for pulses to travel through the delay line controls the open time of the fuel injectors.

The oscillator frequency can change continuously in response to changes in the values of input signals. Thus the opening and closing times of the injector associated with each cylinder likewise can vary from cycle to cycle. In addition, the time that each fuel injector remains open can vary from injector to injector in response to changes in the oscillator frequency.

Means are provided for injecting additional fuel into selected cylinders in response to sudden increases in demand and to cut off all fuel to the cylinders in response to selected decreases in demand.

While the electronic control system of this invention is designed to operate with an engine wherein each cylinder has an adjacent fuel injector means which is individually controlled according to the fuel demands of that cylinder, this control system can also be adapted to operate with an engine using batch injection.

In one embodiment, the invention uses operational amplifiers to generate the signals which control the period of the output signal from the computing oscillator. Usually a transducer is connected in the input or feedback circuit of an operational amplifier. As the value of the parameter sensed by the transducer changes, the impedance introduced into the circuit changes, thereby changing the gain of the amplifier. By interconnecting selectively-poled diodes in parallel and series with a resistor, for example, between the input lead and the output lead of an operational amplifier, the output signal from the operational amplifier is made piecewise linear. The input signal voltage at which the operational amplifier begins to produce a linear output signal can be controlled by varying the nominal voltage on one of the input leads to the operational amplifier. By combining a plurality of piecewise linear output signals from a corresponding plurality of operational amplifiers, the system can be made to generate control signals tailored to the actual operating characteristics of a selected engine. Thus, for example, the fuel injection time duration can be matched very accurately to the parameters upon which time duration depends.

Input parameters such as temperatures can be converted into output signals appropriate for use in this control system by placing thermistors, temperature dependent resistive elements, or any other element whose characteristics are appropriately temperature dependent, in the input or feedback circuit of the operational amplifier so that temperature changes vary the output voltage from the operational amplifier.

DESCRIPTION OF THE FIGURES

FIGS. 4a through 4h show circuits used to detect manifold pressure and other parameters which affect engine performance and graphs useful in explaining the operation of these circuits;

FIGS. 5a, 5b and 5c illustrate in more detail the circuitry comprising digital delay 20 (FIG. 1);

DESCRIPTION OF THE PREFERRED EMBODIMENTS

The electronic control system of this invention will be described in conjunction with a fuel injection system suitable for use with an eight cylinder automobile engine. With appropriate changes, this system can be used with engines containing other numbers of cylinders. It should be recognized that this electronic control system is appropriate for use with any repetitively-activated equipment where the time of activation depends upon measurable variables.

Figure 1:
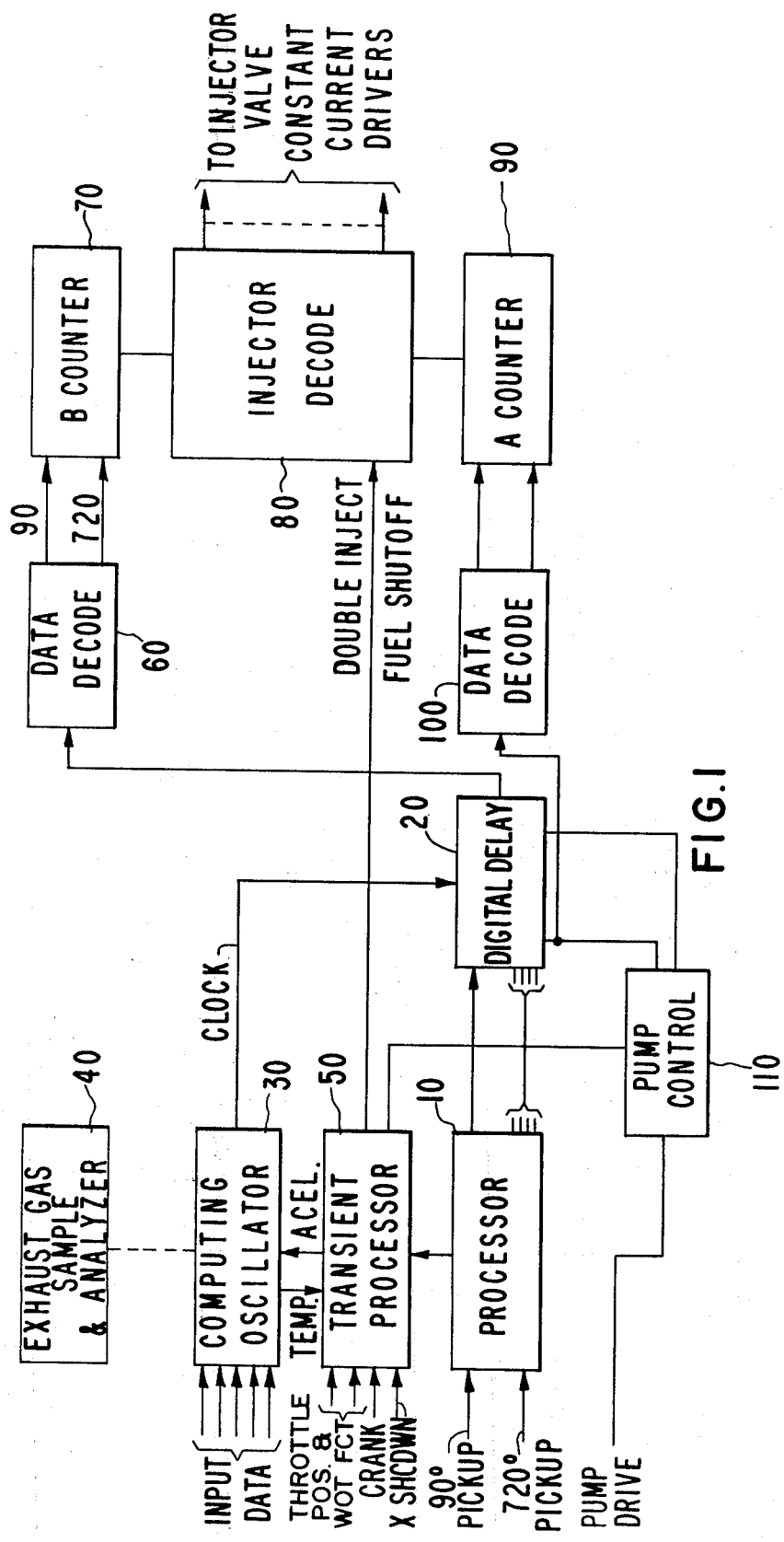
FIG. 1 shows in schematic block diagram form, the general arrangement of the functional components of the electronic control system of this invention.

FIG. 1 shows a schematic block diagram of the system of this invention. A transducer produces a signal every 90° of rotation of the engine's crank shaft. This signal, transmitted to that input lead to processor 10 labeled "90° pickup", activates processor 10 to produce a pulse which is transmitted to digital delay 20. This pulse is driven through delay 20 at a frequency determined by the fundamental frequency of a clock signal from computing oscillator 30.

The period of the pulses from oscillator 30 is determined by input signals from a variety of sources. The primary inputs used to control the frequency of the output signal from computing oscillator 30 are signals representing the absolute manifold pressure, engine temperature (which can be monitored at a variety of places including the exhaust manifold, block head, crankcase, cylinders or any other point which yields a temperature which is representative of the engine temperature) air inlet temperature, fuel temperature, speed of the engine and throttle position. In addition, battery voltage and a measure of the torque being delivered by the engine can also be used to influence the frequency of the signal from computing oscillator 30.

The effect of each input parameter on fuel charge varies. Some parameters have a major effect on the fuel charge, while other parameters have a very small influence on the fuel charge. Under normal operating conditions, the fuel charge injected by each injector is controlled mainly by the manifold pressure and engine speed. Air, fuel and water temperature also influence the fuel required, in decreasing importance as listed under normal hot running conditions only. During warm-up, water temperature is the most important temperature parameter followed by the air and fuel temperatures, respectively.

Transient processor 50 computes input signals for use in controlling oscillator 30 from crankshaft and throttle positions. Separate signals representing wide open throttle position, ($\overline{\text{WOT}}$), fully closed throttle position (FCT), engine speed, power to the crank motor and shut-off information are also processed by processor 50. The computing oscillator responds to the signals from processor 50 and to its other input signals and produces an output signal with a frequency controlled by these and other input signals.

The functional relationships between the required fuel charge and the input parameters depend upon the particular engine configuration. Much work has been done defining these relationships. See for example a book entitled "Aircraft Powerplant Handbook" published in January 1949 by the U.S. Department of Commerce where many of these relationships are discussed.

The output pulses from oscillator 30 drive groups of pulses from processor 10 through digital delay 20. The times for the pulse groups to pass through digital delay 20 are inversely proportional to the frequency of the output signal from oscillator 30.

Two pieces of information are derived by the passage of the pulse groups through digital delay 20. Data decode 100 detects the presence of each pulse group at the beginning of digital delay 20. In response to this, data decode 100 generates a control signal which is transmitted to "A" counter 90. This signal steps counter 90 one digit. Counter 90 is capable of counting up to N, where N is an integer representing the maximum number of cylinders in an engine (assumed to be eight for this explanation). The change in count in counter 90 results in a signal being transmitted to injector decode 80. This signal identifies the particular cylinder into which fuel is to be injected. Injector decode 80 then transmits a signal to open the correct injector. Fuel is then injected into either the manifold or directly into a cylinder.

When the pulse group traveling through digital delay 20 reaches the end of delay 20, a signal is transmitted to data decode 60. Data decode 60 then generates a pulse which is transmitted to "B" counter 70. Counter 70 likewise can contain N different numbers. The change in count in counter 70 results in a signal being transmitted to injector decode 80. This signal terminates the injection of fuel.

A plurality of pulse groups are transmitted in sequence through digital delay 20. Each pulse group activates in sequence, data decode 100 and data decode 60 to start and stop the injection of fuel into the appropriate cylinder. In this manner each injector is controlled in sequence to provide the proper amount of fuel to its corresponding cylinder.

It should be noted that the time required for pulse groups to travel through delay 20 varies depending upon the frequency of the output signal from oscillator 30. Thus, this control system responds rapidly to changes in operating conditions of the engine to correct the amount of fuel injected into each cylinder.

COMPUTING OSCILLATOR 30

Figure 2:
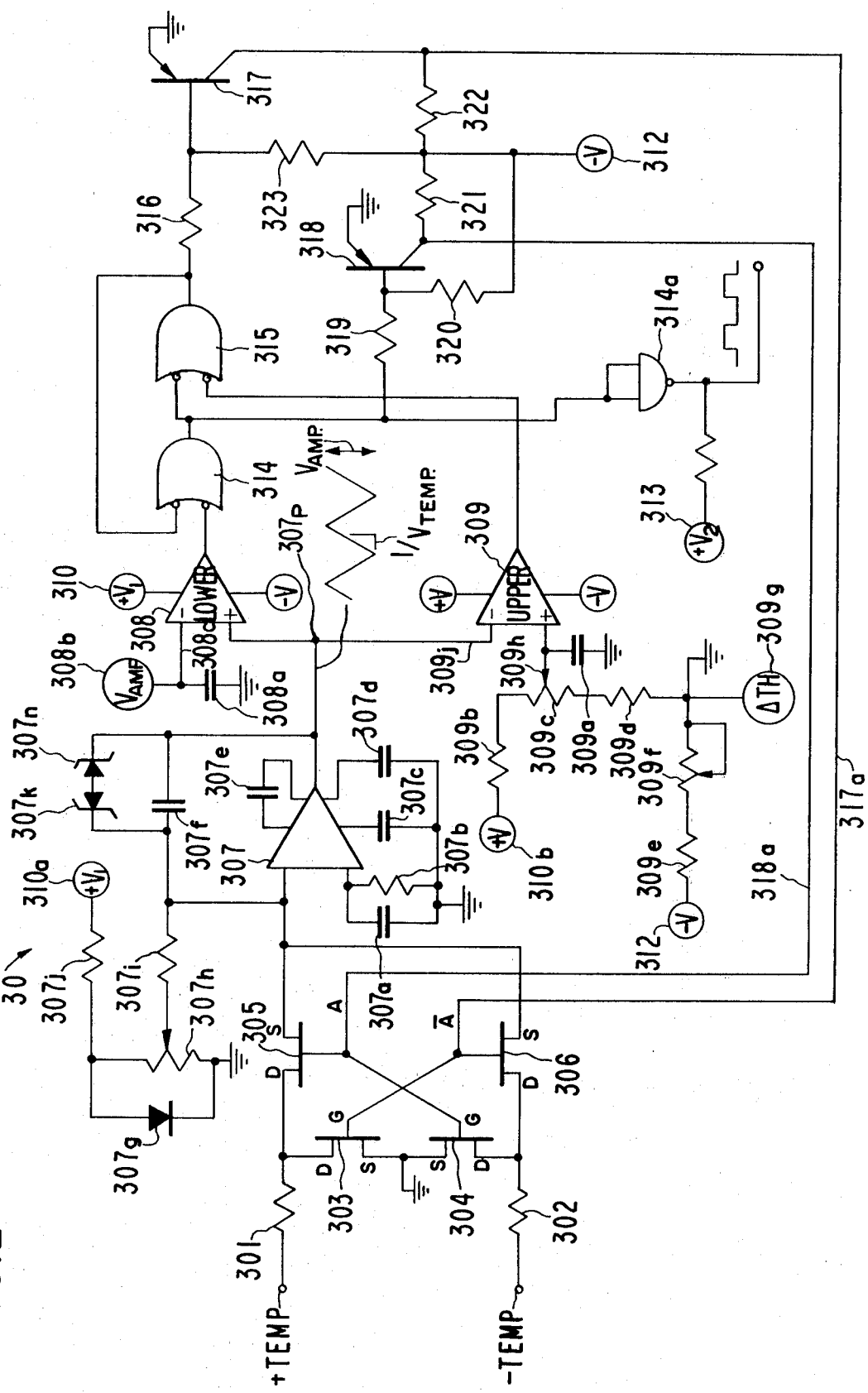
FIG. 2 shows in more detail the computing oscillator 30 shown in FIG. 1.

FIG. 2 shows the circuit comprising oscillator 30 (FIG. 1). The signals to this circuit include signals (+TEMP and −TEMP) representing selected temperatures and a signal representing the manifold pressure. In general, the fuel required by each cylinder increases as air temperature, water temperature and fuel temperature decrease and as manifold pressure increases. Thus the period of the signal produced by oscillator 30 (FIG. 2) must increase as these temperatures decrease. As the period of oscillator 30 increases, the time necessary for pulses to travel through delay 20, and thus the injection time, increases.

Composite signals representing the influence of selected temperatures are input to oscillator 30 through resistors 301 and 302. A positive signal proportional to temperature (the +TEMP signal) is transmitted through resistor 301. An inverted signal (the −TEMP signal) is transmitted through resistor 302. These two signals are generated in a manner to be described later in conjunction with FIG. 3. MOS transistors 303, 304, 305 and 306 are connected together to form a switching circuit. The sources of transistors 303 and 304 are grounded. The gates of transistors 303 and 306 are connected together while the gates of transistors 304 and 305 are also connected together. The gates of transistors 304 and 305 are connected by lead 318a to the collector of transistor 318. The gates of MOS transistors 303 and 306 are connected by lead 317a to the collector of transistor 317.

The operation of the oscillator circuit will be explained assuming that initially transistor 318 is shut off and transistor 317 is conducting. Thus the collector voltage of transistor 318 is the negative voltage of voltage source 312 while the collector voltage of transistor 317 is the voltage of source 312 plus the voltage drop across resistor 322 or about zero volts. Accordingly, a negative voltage approximately equal to that of voltage source 312 is applied to the gates of transistors 304 and 305 turning them off while a much higher voltage (about zero volts) sufficient to turn on transistors 303 and 306 is applied to the gates of these last two transistors. Accordingly, transistors 303 and 306 provide low resistance paths for signals to travel from their drains to other sources. Transistor 306 is connected to one input lead of operational amplifier 307. The other input lead to amplifier 307 is grounded through a filter comprising capacitor 307a and resistor 307b. Transistor 303 is connected to shunt to ground the unused +TEMP signal source.

When transistor 318 is off, transistor 306 is on and the input voltage generated by the −TEMP input transducer is applied to integrating amplifier 307. The input current to amplifier 307 is integrated by capacitor 307f. Resistors 307i, 307j and 307h provide an additional means for controlling the time necessary for the voltage across capacitor 307f to reach a desired value. Zener diodes 307k and 307n limit the output voltage of amplifier 307 to within the input voltage limits of comparators 308 and 309. In normal operation diodes 307k and 307n are not needed.

Thus, initially the output voltage from amplifier 307 has a linearly increasing positive shape. This output signal is passed to the positive and negative input leads to comparators 308 and 309 respectively. Input leads 308c and 309h to comparators 308 and 309 receive voltages representing manifold absolute pressure (the $V_{amp}$ input 308b) and acceleration (the ΔTH, for change in throttle linkage position, input 309g) respectively. These two leads are also coupled by capacitors 308a and 309a to ground. In addition, input lead 309h is coupled through variable resistor 309c and resistor 309b to positive voltage source 310b and also through resistors 309d, 309f and 309e to negative voltage source 312. The sliding contact on resistor 309c sets the threshold voltage for comparator 309.

Comparator 309 produces a low-level output signal in response to a positive-going ramp signal on lead 309j going more positive than the voltage at the wiper of potentiometer 309c. This low-level output signal is applied to one input lead to NOR gate 315. For reasons to be explained shortly, NOR gate 315 thus produces a high-level signal.

NOR gates 314 and 315 are connected as an RS flip-flop. When the output signal from amplifier 307 is below the level of the reference signal on lead 309h, comparator 309 produces a high-level output signal. It should be noted that the reference signal on lead 309h to comparator 309 always has a higher value than does the reference signal from source 308b which is transmitted on lead 308c to comparator 308. (i.e. $V_{308c} < V_{309h}$). Thus the output signal from NOR gate 315 is low-level. This low-level signal is transmitted through resistor 316 to the base of PNP transistor 317 thereby turning on transistor 317. As described above, the collector voltage of transistor 317 maintains conducting the channels associated with FET transistors 303 and 306. When, however, as described above, the positive-going ramp signal from amplifier 307 reaches a selected value ($V_{309h}$), the output signal from comparator 309 drops to low-level thereby switching the output signal from NOR gate 315 from low-level to high-level. This high-level output signal turns off transistor 317 and is fed back to the other input of NOR gate 314. NOR gate 314 produces a low-level signal which is applied to the base of transistor 318 through resistor 319. This low-level signal turns on transistor 318 thereby raising the voltage on the gates of the FET transistor 304 and 305 to zero. Consequently, these two transistors turn on while transistor 317 shuts off dropping the gate voltages of, and thus turning off, FET transistors 303 and 306. The +TEMP signal from the temperature transducer is now applied through resistor 301 to the input lead of operational amplifier 307. The charge previously built up on capacitor 307f now is dissipated. Accordingly, the level of the output signal from operational amplifier 307 drops. When this output signal drops beneath the level of the signal $V_{amp}$ from source 308b on lead 308c to comparator 308, the output signal from comparator 308 drops to a low level. This turns off transistor 318 and turns on again transistor 317.

Thus the output signal from amplifier 307 assumes a triangular shape, as shown in FIG. 2. The period of the waveform varies with the rate at which capacitor 307f charges and discharges. The higher the charge rate or current, the shorter the period. The current, in turn, is directly proportional to the voltage difference between the +TEMP and −TEMP input leads. As the potential difference between the signals on lead 308c to comparator 308 and lead 309h to comparator 309 increases, the amplitude of the periodic triangular shaped wave of amplifier 307 increases and thus the period of this wave increases. This results in a longer injection time. Conversely, as the potential difference between the signals on these two leads decreases, the injection time decreases. The potential on lead 308c is controlled mainly by manifold absolute pressure. (See FIG. 4b, amplifier 430). In addition, engine speed also influences the particular signal level on lead 308c.

Figure 8:
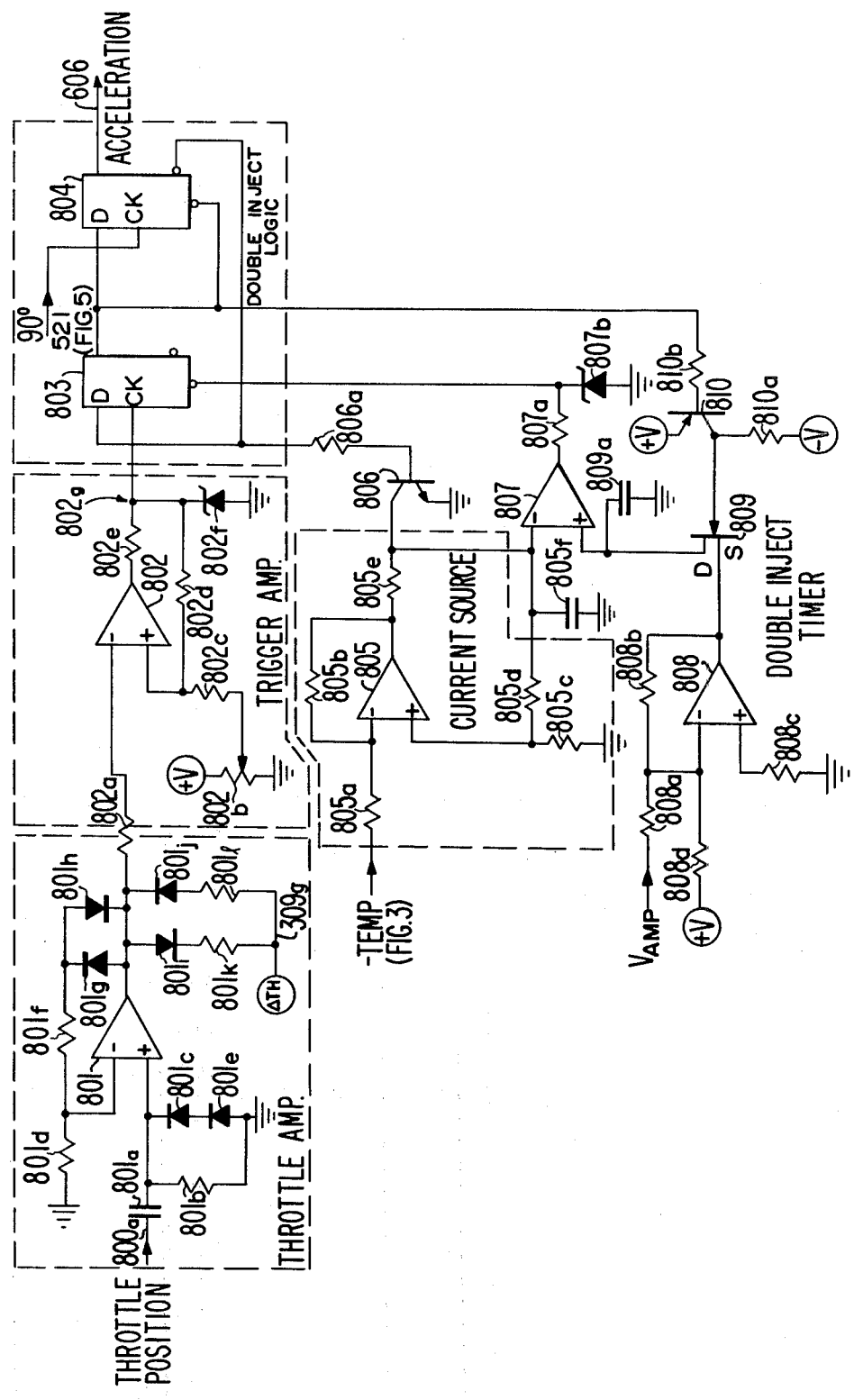
FIG. 8 shows the circuitry for producing a signal indicative of throttle position.

The voltage ΔTH from source 309g which controls the voltage on lead 309h to comparator 309 is primarily controlled by the output signal from the circuit shown in FIG. 8 which represents the position of the throttle and the rate of change of position of the throttle.

It should be noted that the triangular signal from operational amplifier 307 makes it possible to easily service the system by merely looking at the slope and amplitude of the output signal from operational amplifier 307. The amplitude of this output signal is primarily controlled by the manifold absolute pressure and secondarily by engine crankshaft frequency. The slope of this triangular waveform, on the other hand, is controlled primarily by input temperatures and secondarily by transient operating conditions such as wide-open throttle. Thus, errors in the injection period can be attributed to either an incorrect amplitude of the output signal from operational amplifier 307 or, an incorrect slope on this output signal. This feature thus allows the system to be analysed when the injection period is incorrect to determine whether or not the error arises because the output signal from amplifier 307 has an improper amplitude, in which case the error is in the manifold absolute pressure section of the system, or from an improper slope, in which case the error is in the temperature sensing portion of the system.

Any particular component in the system can easily be replaced by a component known to be functioning correctly and the influence of this component on the output signal determined. If there is no change in the shape of this signal, then the component replaced is known to be functioning properly and the search for the improperly functioning component continues until this component is found.

When the error is not in the external transducers, but rather in the processing circuitry itself, analysis of the triangular output signal from amplifier 307 for known values of all the input parameters which affect this signal enables one to determine the particular section of the processing circuitry which is malfunctioning.

The RS flip-flop comprising gates 314 and 315 produces a square wave from the output lead of NAND gate 314a as shown. If desired, an output signal can also be taken from the output lead of NOR gate 315 or from numerous other places in the circuit. The output signal from oscillator 30 is, as described above, used to drive pulse groups through delay 20 (FIG. 1).

Figure 3:
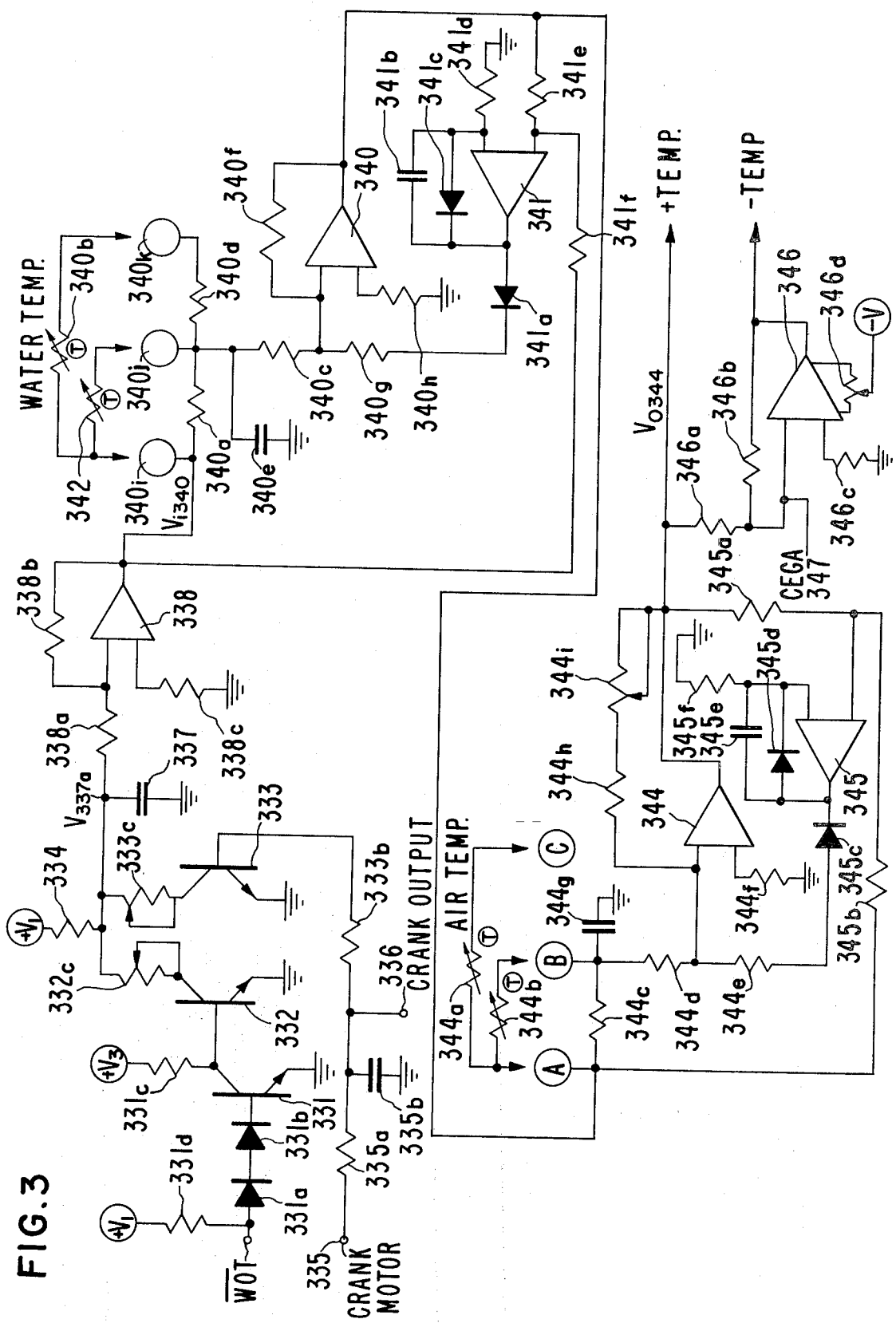
FIG. 3 shows the circuit used to sense selected temperatures which affect engine performance.

FIG. 3 shows the circuitry for detecting, and operating on, signals from transducers connected to the throttle linkage, the engine starter control circuit, the water temperature and the air temperature. First, the operation of the circuitry connected to the wide open throttle transducer will be described. The throttle is fully depressed only when the driver accelerates at a maximum rate. Maximum acceleration requires more fuel than does normal acceleration. In this condition, a cam, electronic sensor, or other means actuated by the throttle linkage grounds or brings to a low-level the lead in FIG. 3 labeled $\overline{WOT}$ thereby shutting off transistor 331. (Diodes 331a and 331b, connected to the base of transistor 331, reduce the probability of noise affecting the state of transistor 331. These diodes can be omitted, if desired.) The collector voltage on transistor 331 is thus driven to the high level represented by the positive voltage source $V_3$. This turns on transistor 332. The collector voltage on transistor 332 then drops to a low level, thus lowering the input voltage to operational amplifier 338. This input voltage is applied to operational amplifier 338 through a filter comprising resistor 338a and capacitor 337. Capacitor 337 smooths the transition from wide-open throttle to steady state operating conditions. As is well known, the output voltage $V_o$ from an operational amplifier is related to the input voltage $V_i$ by the approximate equation $$V_o \simeq -V_i(R_1/R_2) \qquad (1)$$

which can be rewritten with respect to amplifier 338 as $$V_{340} \simeq -V_{337a}(R_{338b}/R_{338a}). \qquad (2)$$

In equation (1), $R_1$ is the feedback resistor and $R_2$ is the input resistor through which the input signal passes to the input lead. Usually an operational amplifier has high gain so the nongrounded input lead of the operational amplifier can be treated as a virtual ground.

The output signal from operational amplifier 338 is next transmitted to a resistive network comprising resistors 340a, 342, 304b, 340d and 340c. Resistors 340b and 342 are negative temperature coefficient thermistors, the resistances of which decrease as the engine's water temperature increases. This network essentially serves as the input resistor ($R_2$ in equation (1)) between the input signal and the input lead to operational amplifier 340. Feedback resistor 340f is equivalent to resistor $R_1$ in equation (1). The circles labelled 340i, 340j and 340k denote connectors by which external transducers are connected to the processing circuitry. This processing circuitry typically is an integrated circuit. As the resistances of resistors 342 and 340b decrease, the output voltage from operational amplifier 340 increases. As explained above in conjunction with equation (1), this increases the difference between the voltage on the leads labeled +TEMP and −TEMP (FIGS. 2 and 3) and decreases the period of the output signal from oscillator 30 (FIGS. 1 and 2).

Operational amplifier 341, together with input resistors 341e, 341f, feedback diode 341c and capacitor 341b, output resistor 341g and diode 341a is a feedback circuit which prevents the output signal of operational amplifier 340 from becoming greater than that at unity gain. This feedback circuit comes into operation when the resistance of thermistors 340b and 342 drops below the value associated with unity gain for operational amplifier 340. This entire feedback circuit is in parallel with feedback resistor 340f.

Diodes 341a and 341c associated with operational amplifier 341 do several things. Diode 341a insures that the output signal of operational amplifier 341 as seen by the input of operational amplifier 340 is of one polarity only. Diode 341c limits unwanted excursions of operational amplifier 341. Capacitor 341b, connected in parallel with diode 341c, insures gain and phase compensation of operational amplifiers 340 and 341 to prevent circuit oscillation.

The next stage of the circuit comprises another operational amplifier stage with feedback very similar to the just described operational amplifier stage. Operational amplifier 344 has an input resistive network comprising resistors 344a, 344b (both thermistors which measure air temperature) and resistors 344c and 344d. Capacitor 344g filters out unwanted noise. Resistors 344h and variable resistor 344i are connected in the feedback path of operational amplifier 344. Resistor 344i provides stage gain adjustment. These resistors are equivalent to resistor $R_1$ in equation (1). Operational amplifier 345 and associated circuitry provides a feedback path to control the output signal from operational amplifier 344 in the same manner as described above in conjunction with operational amplifiers 340 and 341. Amplifier 345 and its associated circuitry can be omitted, if desired, depending upon the specified system response to input temperature and the absolute values of the thermistors chosen for resistors 344a and 344b. For example, when the control system is used over a wide temperature range, operational amplifier 345 might be omitted.

The output signal from operational amplifier 344 represents the influence of air temperature on the period of oscillator 30 (FIGS. 1 and 2). It should be noted from equation (1) that the output signal $V_{o344}$ from amplifier 344 is related to the input signal $V_{i340}$ to amplifier 340 as follows (provided that the feedback circuits which include amplifiers 341 and 345 are inactive):

$$V_{0344} \simeq \left(\frac{R1}{R2}\right)_{344} \times \left(\frac{R1}{R2}\right)_{340} \times V_{i340}. \quad (3)$$

Resistors R1 and R2 with the appropriate subscripts represent the combined resistances connected in the feedback circuits and inputs circuits of the correspondingly numbered operational amplifiers, respectively. From equation (3) it is apparent that the output signal $V_{0344}$ represents the multiplicative effect of temperature changes reflected in the values of $R_{2-340}$ and $R_{2-344}$.

When starting a cold engine, more fuel is required than for normal operating conditions at the same temperature. Thus, in FIG. 3, a crank motor transducer produces a positive output signal on lead 335 upon the application of a voltage to the starter motor. This signal turns on transistor 333. Transistor 333 thus lowers the output voltage applied to one input lead of operational amplifier 338. Capacitor 337 stores a charge reflecting a new input voltage to operational amplifier 338. (It should be mentioned that capacitor 337 performs in the same way whether the voltage drop across resistor 334 is generated by a wide open throttle signal or a crank motor signal.) The time during which extra fuel is injected into the engine after the removal of the crank signal is determined by the values of resistors 334 and 338a and capacitor 337. The charge stored on capacitor 337 depends on the voltage drop across resistor 334. When voltage is no longer applied to the starter motor, the charge on capacitor 337 prevents the circuit from immediately shutting off extra gas supplied to the engine. But, as the charge on this capacitor returns to normal, the period of oscillator 30 and thus the fuel supplied to the injectors gradually returns to the normal value dictated by the other engine operating conditions. The size of capacitor 337 is varied to reflect the different engines or vehicles used with the electronic control system of this invention. As the size of the engine increases, the engine takes longer to respond to changes in demand and capacitor 337 is made larger. Also, as vehicle size increases, capacitor 337 is made larger because more fuel is required to accelerate the vehicle.

If a driver accelerates using wide open throttle, but then suddenly takes his foot off the accelerator, another circuit to be described later shuts off all fuel to the engine. Meanwhile, the charge on capacitor 337 returns to normal. The result is that minimal excess hydrocarbons and carbon monoxide in the form of incompletely burned fuel are expelled into the environment. For a large engine, the time constant of the RC circuit of which capacitor 337 is a part is approximately one to two seconds.

Operational amplifier 338 should have a low output impedance to reduce the errors contributed by this impedance to the signal produced by thermistor 340b. Likewise the output impedance of operational amplifier 340 should be low to similarly minimize the impact of this impedance on the following temperature sensing thermistors. Output resistances of operational amplifiers are typically less than 10 ohms. Thermistors, by comparison, have an impedance from several hundred ohms to several thousand ohms.

Thermistors have been described in FIG. 3 for sensing water temperature and air temperature. An additional operational amplifier stage can be added, if desired, for fuel temperature. Other operational amplifiers can be added with gain-controlling thermistors to sense any other temperatures of importance in controlling the fuel demanded by the engine. Among these temperatures are exhaust gas temperature, oil temperature, block temperature, and in more sophisticated systems, individual cylinder temperatures.

PROCESSOR 10; CONTROL OF INJECTION TIMING AND SYNCHRONIZATION

Processor 10 processes the signals from the 90° and 720° transducers.

FIGS. 5a and 5b show in more detail the amplification circuits used with the 90° transducer and the 720° transducer. The operation of these transducers will be described in conjunction with the 90° pickup circuitry. The circuitry associated with the 720° pickup works in substantially the same manner, only less frequently. A signal from the 90° transducer, which can be mounted on the distributor shaft, crankshaft, or camshaft, is detected and transmitted directly on leads 501 and 502 to difference amplifier 507. The output signal from amplifier 507 is connected to one input lead of AND gate 511 and is filtered by capacitor 509. The other input lead to this AND gate is connected to a positive voltage source. The output signal on lead 513 from AND gate 511 changes from a low level to a high level in response to a pulse detected by the 90° pickup transducer. The differential mode connection from the 90° transducer to difference amplifier 507 prevents common mode signals and stray signals from activating AND gate 511.

The 720° signal is processed in a similar manner using the circuit of FIG. 5a.

The output signal from the 90° pickup circuitry on lead 513 is sent to transient processor 50 (FIG. 1), which will be described later. Processor 50 provides special corrections for certain types of operations. The output signal from the 720° pickup circuitry is sent to processor 10 only.

It should be noted that all degrees used in this specification are degrees of rotation of the crankshaft. In a four-cycle, eight-cylinder engine, a fuel-air mixture is inducted into a new cylinder every 90° rotation of the crankshaft. For all types of four-cycle engines, an engine cycle is completed every 720° rotation of the crankshaft.

FIG. 5c shows in more detail the logic circuitry of processor 10 and digital delay 20. The output signal from processor 10 (FIG. 1) comprises two pulses when this output signal is generated by a signal from a 90° pickup transducer. However, when an input signal is received from the 720° pickup transducer, processor 10 produces a four pulse output signal.

The two pulse output signal occupies two locations in digital delay 20 while the four pulse output signal from processor 10 occupies four locations of digital delay 20. The 90° pickup signal is inverted in amplifier 523 (FIG. 5c) and then sent to 90° memory 525. Memories 525 and 526 may typically comprise JK (or D) flip-flops Fairchild device type 9L24 as manufactured by the assignee of the present application. There, the 90° signal is held for a period of time sufficient to place two pulses in shift registers 530-1, the first register in digital delay line 20. The digital delay line 20 comprises shift registers 530-1, 530-2 . . . 530-N, and 531; which shift registers may typically comprise 8-bit shift registers Fairchild device type 93L28 as manufactured by the assignee of the present application. The presence of pulses in the first two locations in shift register 530-1 is detected by NAND gate 527. The signal on the input lead to NAND gate 527 from 720° memory 526 is normally high level. The signals on the two input leads to NAND gate 527 from shift register 530-1 are normally low level. Thus NAND gate 527 produces a normally high-level output signal. However, upon the transfer of the two high-level pulses from memory 525 to the first two locations of shift register 530-1, the signal levels on all three input leads to NAND gate 527 will go high and the output signal from NAND gate 527 will go to a low level. This produces a high-level output signal from NOR gate 528 which in turn is transmitted through inverter 529 to the reset terminal of 90° memory 525 to clear this memory. Thus, the output signal from 90° memory 525 drops to a low level again. Consequently, the remaining clock pulses from oscillator 30 place low-level signals in the first location of shift register 530-1 rather than a high-level signal. Meanwhile, the high-level pulses formerly in this location are shifted through delay line 20.

The signal on the output lead from 720° memory 526 is normally high level. When, however, the 720° pickup signal is received, the output signal from 720° memory 526 drops to a low level thereby disabling NAND gate 527. However, when shift register 530-1 contains four pulses in its four locations, NAND gate 534 is activated and produces a low-level output signal. This low-level output signal is transmitted through NOR gate 528 and inverter 529 and again changes the output signal from 90° memory 525 from high level to low level.

The 720° memory 526 is deliberately activated slightly earlier than the 90° memory 525 and thus disables NAND gate 527 before memory 525 is activated. Thus, the 90° memory will have a high level output signal stored in it for four periods of the signal from oscillator 30 during which time the output signal from 720° memory 526 is low level (activated). The output pulse from inverter 529 also clears 720° memory 526.

The presence of two pulses in shift register 530-1 denoting the receipt of a signal from the 90° transducer by processor 10 results in NAND gate 535 producing a low-level output pulse. NAND gates 534 and 535 comprise data decode 100 (FIG. 1). The low-level output pulse from gate 535 is sent to "A" counter 90 (FIG. 1). Counter 90 controls, through injector decode 80, the particular fuel injector through which fuel is to be injected and initiates fuel injection by a change in its state in response to the signal from data decode 100. Injector decode 80 selects in sequence the injectors to be activated in accordance with the firing or injection order of the engine. The first injector to be activated is opened for a time determined by the time necessary for the two pulses in digital delay 20 to pass from the first shift register 530-1 (FIG. 5c) in delay line 20 to the last shift register 531 in this delay line. NAND gates 532 and 533 comprise data decode 60 (FIG. 1). When the two pulses from a 90° pick-up transducer reach shift register 531, a signal is sent from NAND gate 533, which detects the presence of these two pulses in the first two locations in shift register 531, on lead 539 to "B" counter 70 (FIG. 1). Counter 70 then sends a signal to injector decode 80 to shut the injector valve. Each signal from "B" counter 70 to injector decode 80 is routed to the correct injector valve, as is each signal from "A" counter 90, by the logic matrix within injector decode 80. It should be mentioned that injector decode 80 can be a standard demultiplexing circuit.

As explained above, the frequency of the output signal from computing oscillator 30, and thus the period of this signal, vary in response to the input signals to controlling oscillator 30. Digital delay line 20 has a fixed number of stages M where M−X=N. X is the number of extra stages in delay line 20 required to detect the presence of pulse groups at the beginning and end of delay line 20. In this case, X is four (4). The real time period required for a signal to pass through delay 20, is that elapsed time period needed for the computing oscillator to generate N pulses. This elapsed time defines the period that a currently active injector will be held open. Accordingly, the times for which the injector valves are left open as the result of control signals from injector decode matrix 80 vary smoothly with variations in the frequency of the output signal from oscillator 20. The output signal from the oscillator is updated N times while an injector valve is open. Because the time that an injector is open is the integral over time of the period of the output signal from oscillator 30, noise tends to have little effect on the resultant injection time. The frequency in cycles per second of the output signal from oscillator 30 is typically greater than 2/5 times the engine RPM.

It should be noted that the pulses present in 90° memory 525 and 720° memory 526 (FIG. 5c) are invariably removed or erased prior to the removal of the 90° or 720° pick-up signals on leads 521 and 522 respectively and certainly long before the valve gear train rotates 90°.

Upon activation of the 720° transducer, four pulses are injected in sequence into delay line 20. The receipt of the second of the four high level pulses in shift register 531 activates NAND gate 533 which steps "B" counter 70 to denote the injector then open. This activates injector decode 80 to close this injector.

The receipt of the fourth high level pulse in shift register 531 (FIG. 5c) activates NAND gate 532. NAND gate 532, which produces a normally high level output signal, now sends a low level signal to "B" counter 70 (FIG. 1) to clear this counter. The output signal from NAND gate 534 (FIG. 5c) is similarly sent to "A" counter 90 (FIG. 1) to clear this counter once each engine cycle. Thus NAND gates 534 and 532 synchronize the system once each engine cycle.

Both the "A" counter 90 and the "B" counter 70 are essentially binary registers which can store pulses representing P digital numbers representing the numbers of the cylinders into which fuel is to be injected. In an eight cylinder engine, counters 70 and 90 can store pulses representing digital numbers from 0 to 7. By the use of feedback with a three bit counter, one can restrict the maximum count stored in the counter to six and thus convert the counter to use with six cylinder engines. The number stored in "A" counter 90 represents the cylinder which is to receive the fuel which is being, or has been injected. Setting the count in "A" counter 90 to zero in response to a change in state of the 720° pick-up signal means that the injector corresponding to a zero count in "A" counter 90 has been opened. Setting "B" counter 70 to zero in response to the delayed 720° pick-up signal reaching shift register 531 means that the injector corresponding to zero count will be closed.

COUNTERS 70 AND 90 AND INJECTOR DECODE 80

Figure 6:
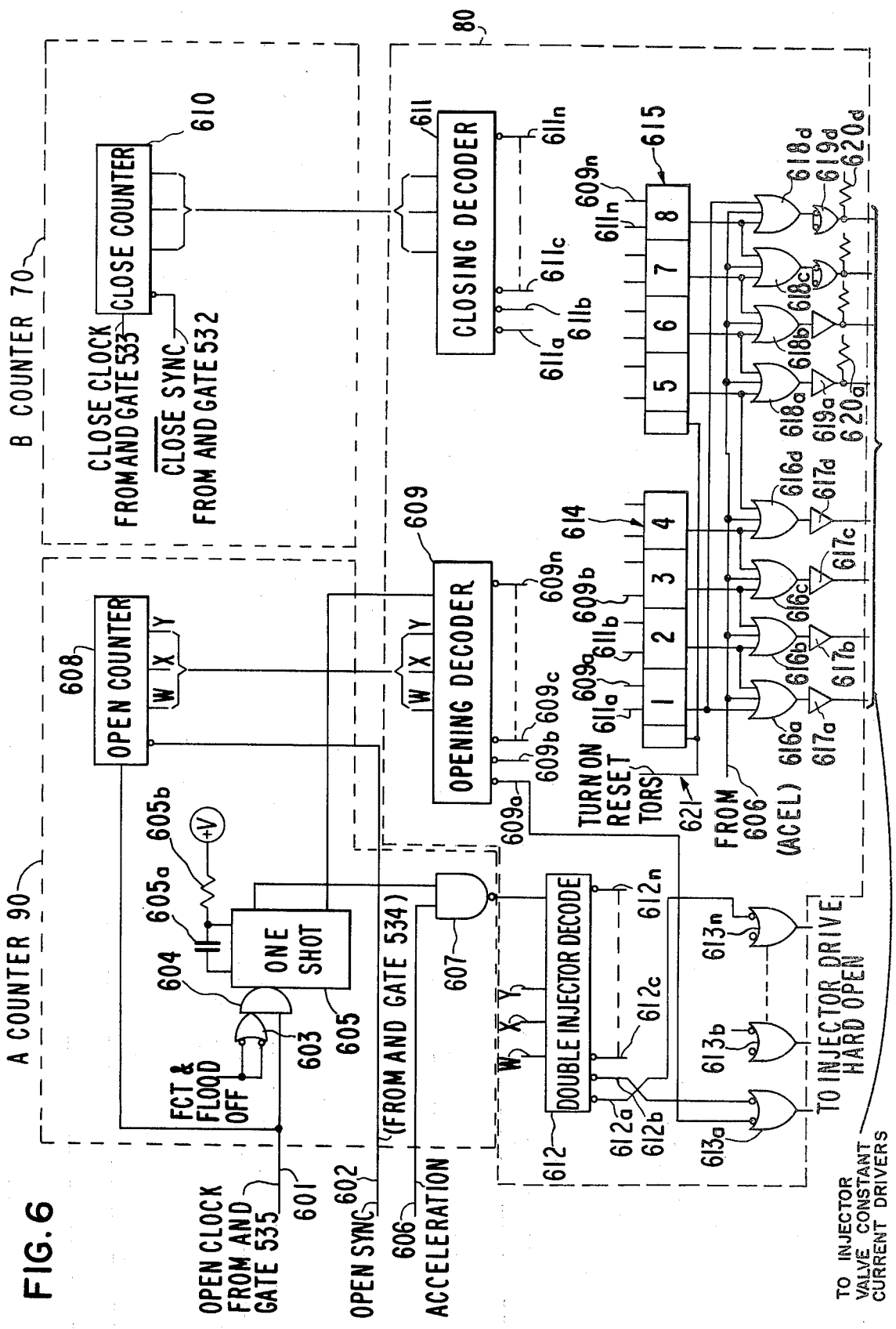
FIG. 6 shows the injection decoding and control circuitry shown in blocks 60, 70, 80, 90, and 100 of FIG. 1.

FIG. 6 shows the manner in which the signals from NAND gates 534 and 535 (FIG. 5c) are used to control the state of "A" counter 90 (FIG. 1). Counter 90, shown in FIG. 6, comprises one-shot 605 and counter 608. Counter 608 may typically comprise a 4-bit binary counter Fairchild device type 93L16 as manufactured by the assignee of the present application. Signals denoting fully closed throttle position (denoted FCT) and flooding of the engine are transmitted through NOR gate 603 to one input lead of AND gate 604. Open clock pulses from NAND gate 535 (part of Data Decode 100, FIGS. 1 and 5c) are transmitted to the other input lead of AND gate 604. As will be explained shortly, signals from one-shot 605 in response to the FCT or flood conditions prevent additional fuel from being injected into each cylinder. AND gate 604 activates one-shot 605. The period of one-shot 605 is controlled by the values of resistor 605b and capacitor 605a connected to one-shot 605 and the positive voltage source as shown. The other input lead to AND gate 604 is connected by lead 601 to the output lead from NAND gate 535 (FIG. 5c). NAND gate 535 produces an output pulse every time the 90° pickup transducer produces a pulse. The pulse from gate 535 triggers one-shot 605 and also is transmitted directly to counter 608 where it changes the count by one unit. Periodically, an output pulse is produced by NAND gate 534 indicating the receipt of a signal from the 720° transducer. This output pulse is transmitted on lead 602 directly to counter 608 and there resets counter 608 to zero. The count in counter 608 controls the states of the output signals on lead 609a through 609n from opening decode 609. Opening decoder 609 may typically comprise a one-of-ten decoder Fairchild device type 93L01 as manufactured by the assignee of the present application. In one embodiment counter 608 can store up to a three (3) bit binary code word. Other embodiments of counter 608 can store n-bit binary code words, where n is a selected integer. When counter 608 thus receives a pulse, the signal on the output lead from opening decode 609 corresponding to the new binary code word stored in counter 608 goes to a low level. This low-level signal has a duration controlled by the output pulse from one-shot 605. One-shot 605 was triggered by the same pulse from NAND gate 535 that changed the state of counter 608.

When the system is in synchronization, the count in counter 608 will go to zero just prior to the receipt of the 720° reset pulse. From the description of the circuitry of FIG. 5c, it should be remembered that the 720° reset pulse comes from NAND gate 534 two clock periods later than does the 90° pulse signal from NAND gate 535. Thus, if the system is in synchronization, open counter 608 will already have been set to zero and the reset pulse from NAND gate 534 (which detects the 720° transducer signal) will arrive after the 90° transducer pulse has advanced the counter 608 to zero. Thus when counter 608 is synchronized with the rest of the system, there is no change in the state of this counter upon the receipt on lead 602 of the output signal from NAND gate 534 (FIG. 5b).

If, however, counter 608 is out of synchronization, the reset pulse from 720° decoder NAND gate 534 would reset counter 608 to zero. The error in injection time of the first cylinder in the injection sequence resulting from this lack of synchronization is the two clock-pulse delay necessary to generate the 720° signal. Because of valve inertia, the injector will not have opened significantly in that time. By increasing the length of the delay line, or the clock frequency, or both, this error can be reduced. Lack of synchronization can possibly also cause excessive fuel in some cylinders and not enough fuel in other cylinders.

FIG. 6 also shows closing decoder 611 which closes the injectors. Closing decoder 611 may also typically comprise a one-of-ten decoder Fairchild device type 93L01. The closing clock signal is transmitted to close counter 610, part of "B" counter 70 (FIG. 1), from one of two sources; NAND gate 533 produces an output pulse when the 90° pickup pulse group transmitted into delay line 20 reaches shift register 531. Close counter 610 may also typically comprise a 4-bit binary counter Fairchild device type 93L16. This pulse from NAND gate 533 is transmitted to close counter 610 to change the count recorded in this counter. Upon the receipt of the new count, the signals from close counter 610 representing this new count are transmitted to closing decoder 611 which activates the proper output leads 611a through 611n to close the injector corresponding to the cylinder represented by the new number in counter 610. Counter 610 is synchronized by a signal from NAND gate 532 (FIG. 5c).

The output signals from the opening decode circuit 609 are sent two places. First, these signals are sent to the corresponding input lead of circuits 614 and 615. Circuits 614 and 615 each contain four flip-flops and thus control eight injectors. Circuits 614 and 615 may each for example, comprise a quad latch Fairchild device type 93L14 as manufactured by the assignee of the present application. A low level signal on output lead 609a is transmitted to the input lead to flip-flop 1 of circuit 614, on the lead labeled 609a. This signal changes the state of this flip-flop. The signal on the output lead from flip-flop 1 in circuit 614 is transmitted through half adder 616a and buffer-inverter 617a. The current from inverter 617a comprises a low-level holding current which holds open an injector until a signal from closing decoder 611 changes the state of the flip-flop. The output signal on lead 609a from opening decoder 609 simultaneously is sent to the corresponding NOR gate 613a. This produces a high level signal on the output lead from NOR gate 613a. This high level signal drives the same injector valve hard open thereby increasing the speed with which the injector valve opens and thus the amount of fuel placed in the cylinder in a given time.

It should be noted that the time an injector is left open is determined by the time it takes for the pulse groups to travel through digital delay line 20 (FIGS. 1 and 5c). As engine speed increases, a pulse group which opens a first injector can still be traveling through delay line 20 when a second pulse group is injected into delay line 20 by the next signal from the 90° transducer. In response to this second pulse group entering the delay line, a second injector is opened while the first injector is still open. As the engine speed increases, up to seven injectors can be open at the same time using the system of this invention. In theory, all eight injectors can be open at the same time. However, close counter 610 produces a closing signal for 90° of crankshaft rotation. Thus any and each injector must be closed for one-eighth of an engine cycle. Therefore, at any time during the engine cycle, one injector must be closed. The system, however, can be modified to avoid this limitation by having close counter 610 produce a "close" pulse of a more limited duration.

In one embodiment fuel injection preferably occurs a few degrees before the intake valve to the cylinder opens. Typically, the intake valve is open for about 200° to 230° rotation of the crankshaft. On the other hand, the injectors are injecting fuel over from 10° to 20° rotation of the crankshaft at idle and up to 600° at full power. If the driver decides to accelerate before the fuel being pulled into a cylinder has been ignited, the injector associated with that cylinder can be reopened to inject more fuel into the manifold and thus into the cylinder in response to the acceleration signal. This feature provides additional flexibility for the operation of the system and is described next.

DOUBLE INJECT DECODE 607, 612, 616 AND 618

FIG. 6 also shows double injector decoder 612. The decoder 612 may also typically comprise a one-of-ten decoder Fairchild device type 93L01. This decoder is provided to open a previously opened and now closed injector in response to a signal from transient processor 50 (FIG. 1) that the driver has pressed down on the accelerator.

Pressing down on the accelerator results in a high-level signal being transmitted on lead 606 to one input lead of NAND gate 607 thereby enabling NAND gate 607. The generation of this pulse is to be described in conjunction with FIG. 8. When the pulse from NAND gate 535 (FIG. 5c) is transmitted on lead 601 to AND gate 604 thereby activating one-shot 605, the output signal from one-shot 605 goes to a high level. This output signal is applied to the other input lead of NAND gate 607. NAND gate 607 thereby puts out a low-level output signal which activates double injector decode 612. Double injector decoder 612 works in the same way as open decoder 609 but is programed to open the injector associated with a cylinder for which fuel was previously injected so that an additional amount of fuel can be injected for use by that cylinder.

It should also be noted that the acceleration signal on lead 606 is transmitted to the half-adders 616a through 616d and 618a through 618d. These gates are activated either by a single signal from the corresponding connected flip-flop in register 614 or 615 or by the simultaneous presence of an acceleration signal on lead 606 together with a signal on the next following flip-flop in the registers 614 or 615. Thus the presence of a signal on acceleration lead 606 results in a given flip-flop in registers 614 or 615 activing not only the half-adder 616 or 618 connected to that flip-flop, but also the preceding half-adder connected to the flip-flop.

MANIFOLD PRESSURE SIGNAL PROCESSOR

FIG. 4a through 4d show the electronic circuitry used to generate signals representing manifold pressure. As manifold pressure increases, the airflow through the manifold increases and thus the fuel required to be injected into each cylinder increases. This means that the injection time must also increase. An increased injection time requires a decrease in the frequency of the output signal from computing oscillator 30 (FIG. 1). Accordingly, the output voltage $V_{AMP}$ from operational amplifier 430 (FIG. 4b), to comparator 308 (FIG. 2) must decrease algebraically. This output voltage changes the reference level on one input lead to comparator 308, thus changing the time required for the output signal from operational amplifier 307 to change the state on the flip-flop comprised of elements 314 and 315.

The signal representing manifold pressure is sent through resistor 411a to input lead 411h of operational amplifier 411. The voltage on input lead 411h of operational amplifier 411 is held at virtual ground as in a standard operational amplifier with feedback. Diode 411d insures that when the input voltage $V_{in}$ drops beneath a selected reference voltage established by voltage source 412 and resistors 411a and 411b, the output voltage from the operational amplifier 421 will be clamped above virtual ground by the voltage drop of a forward-biased PN junction. On the other hand, as the input voltage $V_{in}$ to operational amplifier 411 climbs above the selected reference voltage, the output voltage from the operational amplifier drops linearly at a rate controlled by the ratio of resistor 411g to resistor 411a. Diode 411d acts as an open circuit in this circumstance while diode 411e becomes forward biased.

By varying the voltage represented by source 412 or either of resistors 411a and 411b, the voltage $V_{in}$ at which the characteristic curve of $V_{out}$ versus $V_{in}$ assumes a negative slope is varied, as shown in FIG. 4d. FIG. 4d shows several curves all with different values of $V_{in}$ at which the breakpoint in the curve of $V_{out}$ versus $V_{in}$ occurs. The curve which passes through the center of the graph has voltage source 412 equal zero. When voltage source 412 is positive, the breakpoint in the characteristic curve shifts to a negative value of $V_{in}$.

The slope of the non-horizontal portions of the curves in FIG. 4d is given by $V_{out}/V_{in} = -R_1/R_2$. Reversal of the polarity of the diode as shown by the diode in dashed lines in FIG. 4e results in a curve shown by the dashed lines in FIG. 4d. Thus the output signal from operational amplifier 411 with diodes connected as shown has a piece-wise linear characteristic.

Operational amplifier 421 operates in the same manner as does operational amplifier 411.

The reference voltage 412 connected to input lead 411h is selected to correspond to a selected low pressure, such as five inches of mercury absolute which in turn corresponds to a very low air flow rate to the engine. Thus, for manifold pressure beneath five inches of mercury, the injection time is minimized to a selected value. In this condition, the typical engine has a negative torque output. As the manifold pressure increases, signifying a larger air flow to the engine, operational amplifier 411 begins to produce an increasingly negative output voltage. This output voltage then is transmitted to multiplying circuit 414. Likewise, operational amplifier 421 produces an increasingly negative output voltage as the manifold pressure increases above the pressure associated with its reference voltage as set by resistors 421a, 421e and 421f. The output signal from operational amplifier 421 is likewise sent through resistor 422 to multiplying circuit 424.

Circuits 414 and 424 are shown in more detail in FIG. 4f. The input voltage to the circuit is controlled by the settings of potentionmeter resistors 440c and 440d. The output voltages from the operational amplfiers are brought into circuits 414 and 424 on leads 9.

An additional signal is brought into each of multiplying circuits 414 and 424 on lead 4. These signals are derived from operational amplifiers 407 and 408 (FIG. 4a) which in turn operate on signals from operational amplifiers 403, 404 and 405 (FIG. 4a). These last three amplifiers operate in the same manner as operational amplifiers 411 and 421 except that the diodes in the feedback circuits of amplifiers 403, 404 and 405 are reversed in polarity. The polarities of the diodes associated with each operational amplifier in FIG. 4a are determined by the shape of the transfer function desired for the circuit. Thus the transfer characteristics of these operational amplifiers correspond to the dash curve shown in FIG. 4d with the break-point in the characteristic of each amplifier being controlled as described above.

Figure 7:
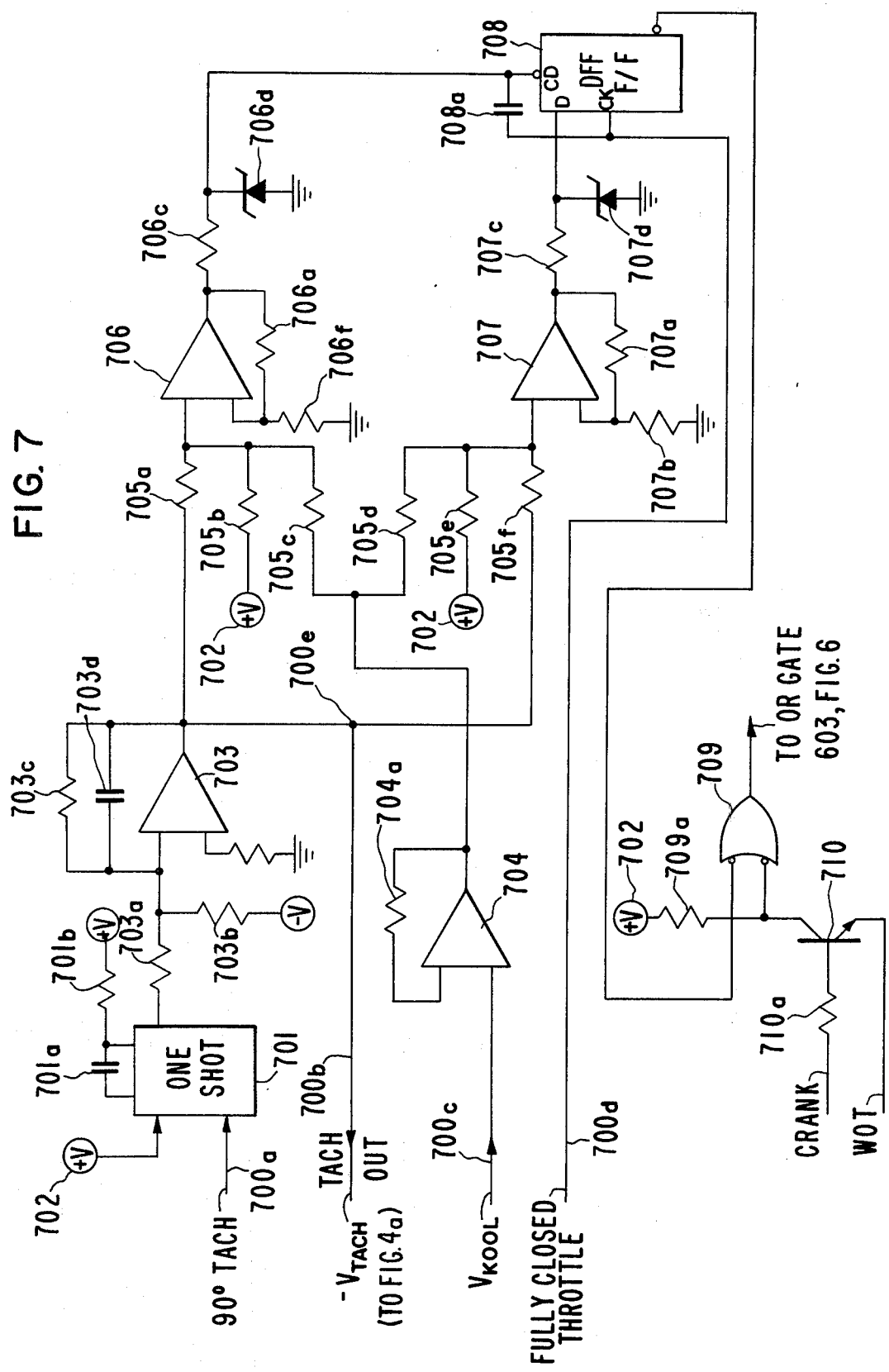
FIG. 7 shows special circuitry designed to provide input signals to the computing oscillator 30 (FIG. 1) reflecting changes in fuel demand.

The input signal to operational amplifiers 403, 404 and 405 are proportional to engine frequency. These signals can be generated from a frequency signal obtained from the crank shaft or the distributor or any other rotating part of the engine suitable for such a measurement. FIG. 7 shows circuitry suitable for generating these signals.

The output signals from operational amplifiers 403 and 404 are fed to the input lead of operational amplifier 408. The output signal from this operational amplifier is denoted S1 and is the input signal on lead 414a of multiplier 414 (FIG. 4b). FIG. 4h shows a typical transfer function of S1 versus engine frequency.

Likewise, the output signal from operational amplifier 405 is passed through operational amplifier 407 and then is sent on the lead denoted S2 to lead 424a of multiplier 424 as shown in FIG. 4b. FIG. 4g shows a typical transfer function of S2 versus engine frequency. Note that the transfer function of FIG. 4g has only one breakpoint because only one active diode circuit (the circuit associated with amplifier 405) is used to generate the curve of FIG. 4g. The transfer function of FIG. 4f has two such breakpoints because two such circuits (the circuits associated with amplifiers 403 and 404) are used to generate the curve of FIG. 4f.

Each multiplier comprises a well-known commercially available circuit such as the μA 795, made by Fairchild Camera and Instrument Corporation. Each multiplier takes two input signals on leads 4 and 9 and produces an output signal on lead 14 proportional to the product of these two input signals. The way in which these multipliers work is well known and thus these multipliers will not be described in detail.

The output signals from multipliers 414 and 424 (FIG. 4b) are transmitted through input resistors 414b, 414c and 424b, 424c to the input leads of operational amplifiers 415 and 425 respectively. The output signals from operational amplifiers 415 and 425 are then transmitted to one input lead of operational amplifier 430 through input scaling resistors 415c and 425c. The resulting voltage $V_{AMP}$ from operational amplifier 430 is sent to input lead 308b (FIG. 2).

FIG. 4c is a curve of injection time versus the ratio of manifold absolute pressure to atmosphere pressure. As injection time increases, the period of the signal from oscillator 30 (FIG. 1) must increase and thus $V_{AMP}$ must decrease algebraically. Note that the slope of the output signal from operational amplifier 307 is independent of $V_{AMP}$. Thus the period of the output signal from amplifier 307 is directly proportional to the amplitude of $V_{AMP}$.

It should be noted that the number of discontinuities in the curve of FIG. 4c can be controlled by controlling the number of operational amplifiers used to generate this curve.

TRANSIENT PROCESSOR 50

FIG. 7 shows the circuitry used to control the cutoff of fuel to the engine. Pulses from the tachometer transducer (located on the crankshaft, for example) are sent on lead 700a to one-shot 701. One-shot 701 produces an output pulse of about 3 milliseconds duration. Operational amplifier 703 has a feedback network comprising a parallel-connected capacitor 703d and resistor 703c and an input resistor 703a. This configuration results in operational amplifier 703 producing an output voltage proportional to the frequency of the pulses from one-shot 701. In one embodiment, amplifier 703 was set to produce 1 volt per 1,000 rpm of the engine.

The output signal from operational amplifier 703 is sent through resistors 705a and 705f to the ungrounded input leads of comparators 706 and 707 respectively. Output lead 700b connected at node 700e to the output lead from amplifier 703 carries the signal from amplifier 703 to input lead 403i to operational amplifier 403 (FIG. 4a). The output signal from amplifier 703 is always negative in this embodiment.

An input voltage derived from a temperature transducer (which might measure engine coolant temperature, for example) is transmitted to amplifier 704 on lead 700c. The output signal from amplifier 704, which provides a correction signal to compensate for deviations in the engine temperature from its normal operating temperature, is sent to the non-grounded input leads of comparators 706 and 707 through resistors 705c and 705d, respectively.

The system has structure for preventing the engine for dying after the fully closed throttle position is sensed. The fully closed throttle position is sensed by a transducer on the throttle linkage. An output signal denoting fully closed throttle is sent on lead 700d to JK flip-flop 708. The output signal from flip-flop 708 then stops the injection of fuel. When the engine slows to a selected speed a given amount above the speed at which the engine will die, fuel is resupplied to the engine. An enabling signal, sent to flip-flop 708 from comparator 707, insures that fuel is not shut off unless the engine speed is sufficiently above the cut-off speed of the engine to insure that there is some hysteresis in the engine's fuel control function.

The signal to disable one-shot 605 (FIG. 6) is transmitted from the output lead on flip-flop 708 through NOR gate 709 to NOR gate 603 (FIG. 6). Normally, the output signal from NOR gate 709 is low level. The low-level output signal from flip-flop 708 corresponding to a sudden deceleration or removal of the foot from the accelerator, results in a high-level output signal being produced on the output lead, of NOR gate 709. This high-level signal disables one-shot 605.

In addition, a high-level output signal can be produced on the output lead of NOR gate 709 by turning on transistor 710. This transistor is turned on in response to a high-level signal on its base from the crank motor transducer indicating that power is being applied to the crank motor simultaneously with a low-level signal on its collector from the lead labeled $\overline{WOT}$ denoting that the driver has fully depressed the throttle. This disables one-shot 605 thereby preventing additional fuel from being injected into the already supposedly flooded engine. The starter motor thus can draw from the engine the excess fuel deposited in the manifold and engine cyliners.

A high-level output signal from comparator 707 enables JK flip-flop 708 to be clocked off by a fully closed throttle signal from the throttle linkage transducer. Flip-flop 708 is reset when one of two events occur. First, if the engine speed drops beneath the given value, the output of comparator 706 goes to a low level thereby resetting flip-flop 708. On the other hand, if the throttle is opened from the closed position, a signal is sent through capacitor 708a on lead 700d to similarly reset flip-flop 708 allowing fuel again to be injected into the engine. Thus the output signal from flip-flop 708 will go high reenabling one-shot 605 (FIG. 6.).

When the engine is cold, more fuel is required to keep it running at a given speed due to increased friction and reduced fuel energy conversion efficiency. Thus, to keep the engine running, the speed at which cut-off occurs is necessarily higher. To do this, a signal is transmitted on lead 700c into the input network associated with comparator 706. The signal on lead 700c labeled VKOOL represents a temperature sensed by a temperature transducer located at some point of the engine. This signal is transmitted through voltage follower 704 to the node between resistors 705c and 705d. This signal then biases the input lead of comparator 706 to a higher voltage than would otherwise be present on this input lead when the engine is running at its operating temperature. This insures that comparator 706 operates to prevent fuel cut-off at a higher engine speed than normal.

It should be noted that feedback resistor 706a associated with comparator 706 provides a positive feedback signal to one input lead of comparator 706. The effect of resistor 706a taken together with resistor 706f is to provide a slight hysteresis in the operation of comparator 706. A similar result is obtained by use of resistor 707a and 707b in conjunction with comparator 707.

THROTTLE POSITION SIGNAL PROCESSOR

FIG. 8 shows circuitry giving an output signal representing differentiated throttle position. Amplifier 801 and its associated circuitry comprise the acceleration enrichment and deceleration leaning circuitry. If the driver wishes to accelerate, and presses down on the throttle, a throttle position transducer produces an increasingly positive signal on lead 800a. This signal is differentiated by capacitor 801a and resistor 801b, and amplified by voltage follower 801. The output signal from amplifier 801 will then also be increasingly positive. This output signal is passed through acceleration diode 801i and resistor 801k to lead 309g to computing oscillator $\Delta TH$ input 309g (FIG. 2). This positively increasing signal will increase the amplitude of oscillation of the periodic signal produced by operational amplifier 307 and hence increase the injection time.

If the driver closes the throttle, a decreasing signal will be differentiated by capacitor 801a and resistor 801b. The differentiated signal will be limited by diodes 801c and 801e. This negative signal will be followed by amplifier 801 and passed through deceleration diode 801j and resistor 801i to lead 309g ($\Delta TH$ input) of oscillator 307 (FIG. 2). This negative signal will slightly decrease the amplitude of the periodic waveform from amplifier 307 and decrease the injection time. The voltages required to offset the voltage drops of acceleration and deceleration diodes 801i and 801j respectively are offset by diodes 801g and 801h in the feedback circuit of amplifier 801. The over-all peak output voltage available for amplifier 801 is determined by the feedback network comprising resistors 801d and 801f and diodes 801g and 801h. Therefore, the output signal of amplifier 801 will have a fast slewing condition within one diode drop above or below ground potential. This output signal is used to enable the double inject circuitry to be described next.

The double inject circuitry comprises a trigger comparator 802, double inject logic 803 and 804, a double inject timer comprising components 805, 806 and 807 and a reference circuit compromising components 808, 809 and 810.

Trigger comparator 802 produces a positive signal on line 802g when the input signal to amplifier 801 exceeds a reference level as selected by trigger level resistor 802b. This positive signal on lead 802g will trigger D flip-flop 803 which thus records the fact that a trigger signal has arrived. The output signal from flip-flop 803 enables flip-flop 804. Flip-flop 804 is then triggered by the next succeeding 90° signal from the 90° crankshaft position transducer thus starting the double-inject mode of operation. The double-inject signal is sent from flip-flop 804 on lead 606 to the double-inject circuitry of FIG. 6.

The double-inject timer comprises components 805, 806 and 807. Timing capacitor 805f is charged in a positive direction by voltage-to-current converter 805. The voltage reference for converter 805 is, in fact, the $-TEMP$ signal input to oscillator 307 as shown in FIG. 2. Thus the rise rate of the voltage on timing capacitor 805f is proportional to the operating temperatures sensed in the engine.

Comparator 807 compares the voltage on capacitor 805f to that on reference storage capacitor 809a. When the voltage on capacitor 805f exceeds that on capacitor 809a, the output signal from comparator 807 will go to a low level. This low-level signal transmitted via resistor 807a and limited by diode 807b, resets D flip-flop 803. When D flip-flop 803 is reset, its output signal goes low-level, clearing flip-flop 804 and thus terminating double injection.

When flip-flop 803 was initially set by a signal from trigger comparator 802, the signal on the Q output lead of flip-flop 803 went to a high level. That high-level signal, passed through resistor 810b to transistor switch 810, turned off transistor switch 810, thus cutting off the current through collector resistor 810a. This caused the voltage at the gate of FET switch 809 to fall, thus interrupting its source-to-drain current conduction. Before the double inject was activated, operational amplifier 808 kept capacitor 809a charged to a potential representing the difference between $V_{AMP}$ (the absolute manifold pressure) and the maximum possible $V_{AMP}$. This potential thus represented the maximum differential injection time that would be expected upon application of full throttle. At the beginning of the double inject sequence, switch 809 is opened and thus this particular differential injection time is stored as a voltage on capacitor 809a. At the same time, capacitor 805f begins charging in a positive direction toward the potential on capacitor 809a. When comparator 807 sees the potentials on these two capacitors as equal, the double inject sequence is terminated by resetting flip-flop 803. Resetting flip-flop 803 turns on transistor 810 via resistor 810b thus turning on switch 809 and updating the charge on capacitor 809a to reflect the difference between the new $V_{AMP}$ and the maximum $V_{AMP}$.

It should be noted that the overall double inject time can be scaled by varying the transfer function of the voltage-to current converter 805 and/or the gain of amplifier circuitry 808.

It should also be noted that there are throttle position sensors associated with the throttle linkage. The primary throttle position sensor can be either an analog or digital sensor representing true throttle position. The output lead from this sensor can be connected to either a pair of analog or digital comparators, respectively, to indicate the signal levels corresponding to fully closed throttle and wide open throttle. There is also the option of mounting one or more sensors directly on the throttle linkage to measure the throttle position.

EXHAUST GAS ANALYSIS, FUEL PUMP AND TURN-ON RESET CIRCUITS

Figure 9:
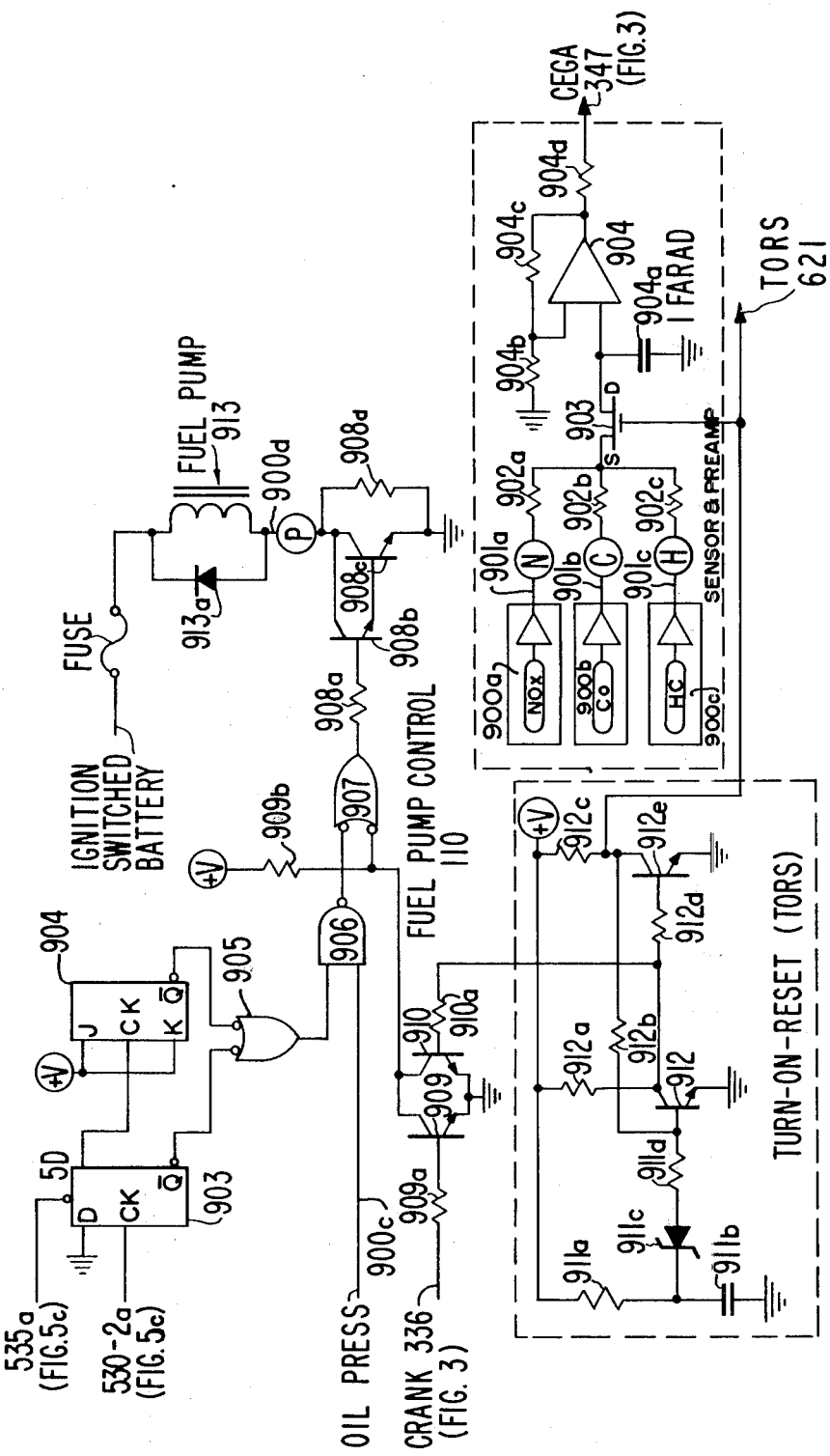
FIG. 9 shows the fuel pump control, turn on reset and exhaust gas analysis circuitry.

FIG. 9 shows the exhaust gas analysis circuitry, the circuitry controlling the high pressure fuel pump and the turn-on reset circuitry.

The turn-on reset circuitry synchronizes the system when the engine is being started. When a positive supply voltage is applied to the system, capacitor 911b charges toward this supply voltage through resistor 911a.

Schmidt trigger 912 is activated through resistor 911d and diode 911c when the charge on capacitor 911b is sufficient to break down zener diode 911c. Schmidt trigger 912 is of conventional design and will not be discussed. Upon activation of Schmidt trigger 912, the output signal from transistor 912e goes high, thus removing the turn-on reset signal on line 621 as fed to RS flip-flops 614 and 615 (FIG. 6). This resets flip-flops 614 and 615.

The output signal of Schmidt trigger 912 is also fed through resistor 910a to transistor 910. The sense of the signal on the collector of transistor 910 is the same as that on line 621, for example, low during turn-on reset. The length of the turn-on reset period is selected to be in the range of one-quarter to four seconds and is the period from system turn-on until the signal on lead 621 goes to a high level.

Fuel pump control 110 comprises flip-flops 903, 904, gates 905, 906, 907, transistors 909, 910 and output driver circuitry 908. It is desirable to limit the output of the fuel pump slightly more than the fuel quantity demanded by the engine. This is accomplished by varying the duty cycle of the power applied to the electric fuel pump in response to the instantaneous fuel demand. This engine demand is measured by combining a submultiple of the injection time with the speed of the engine.

Signals from data decode 100 representing every 90° pulse from the crankshaft position transducer on lead 535a (FIG. 5c) are fed to the "set direct" input of flip-flop 903 (labeled CK). These signals drive the Q output of flip-flop 903 high thus toggling flip-flop 904. Simultaneously, the signal level on the $\overline{Q}$ output of flip-flop 903 goes low. The $\overline{Q}$ outputs of flip-flops 903 and 904 pass through NOR gate 905 and NAND gate 906. NAND gate 906 is enabled by a minimum oil pressure signal arriving from an oil pressure transducer on line 900c indicating satisfactory oil pressure in the engine. The output of NAND gate 906 is then fed through NAND gate 907 into output driver circuit 908 containing turn-on transistor 908b and power transistor 908c. Current drawn by transistor 908c turns on the fuel pump via line 900d. The $\overline{Q}$ output of toggle flip-flop 904 is also fed into NOR gate 905. Every 90° pulse from data decode 100 on line 535a (FIG. 5c) will turn on the fuel pump provided there is minimum oil pressure. Should the oil pressure fail for any reason such as the engine stopping, then the fuel pump will be turned off. The duration of the pulse from flip-flop 903 will be determined by the time that it takes the pulse group which activates NAND gate 505 of data decode 100 to be shifted by computing oscillator 30 through shift registers 530-1 and 530-2. When the first pulse in this group arrives at line 530-2a it will clock a logical zero through flip-flop 903. This will drive the signal on the $\overline{Q}$ output lead of flip-flop 903 high, terminating the drive to the fuel pump. The output pulse from flip-flop 903, as previously mentioned, toggle flip-flop 904. Therefore, the $\overline{Q}$ output of flip-flop 904 will be low during the interval between every other pulse being generated by flip-flop 903. (The $\overline{Q}$ output signal from flip-flop 904 varies at ½ the frequency of the $\overline{Q}$ output signal from flip-flop 903.) This low-level signal will then be sent through NOR gate 905, NAND gate 906 and NOR gate 907 to fuel pump drive circuit 908. The result (assuming adequate oil pressure) is that the fuel pump will be on at least 50% of the time and the width of the $\overline{Q}$ pulse from flip-flop 903 will then add to this 50% bringing the on-time of the fuel pump up to a maximum approaching the 100% at long injection time and high engine speed. Other inputs to the fuel pump drive circuit 908 are a crank signal on line 336 transmitted through resistor 909a to transistor switch 909. The high-level crank signal holds the fuel pump on continuously, overriding signals from flip-flops 903 and 904. Also, upon initial application of power to the system, when the TORS signal on line 621 is low-level, transistor 910 wil turn on thus turning on the fuel pump. This will assure that during the time immediately after system turn on, the fuel pump will also be held on to prime the fueling system. Fuel pump drive circuit 908 is a Darlington pair. Resistor 908d and diode 913a protect transistor 908c from transients generated by the inductive properties of the fuel pump 913 during the turn-off of pump drive 908.

Next to be described will be the exhaust gas analysis circuit. Amplified signals from the various pollutant sensors 900 (FIG. 9) enter the system on lines 901a through 901c. These signals are scaled by resistors 902 selected to represent their relative weighting factors. At the node connecting resistors 902a through 902c to the source terminal of FET transistor 903, a signal is developed which represents the relative pollution level of the engine exhaust, or whether the mixture being delivered is richer or leaner than required. Transistor 903 is on only when the system is running and is disabled by the turn-on reset signal. The weighted signal representing the pollution output of the engine passes through transistor switch 903 to integrating capacitor 904a. Capacitor 904a in combination with resistors 902 form a long-term integrator. The voltage developed across capacitor 904a is amplified by amplifier 904 and fed through resistor 904d to line 347 (FIG. 3) labeled CEGA.

The CEGA signal has a direct effect upon the overall mixture fed to the engine by affecting the −TEMP signal (FIGS. 2 and 3). If the pollution output is excessive as evidenced by oxides of nitrogen or carbon monoxide in the exhaust, for instance, then the mixture is changed to reduce these pollutants to an acceptable figure. Corresponding corrections are made in response to HC and CO polluting gasses. Typically, these corrections are made over a period on the order of from 15 minutes to several hours. This is done so that transient operations of the engine, which may create slightly excess pollution, will have no overall effect on the average mixture ratio. Other embodiments of the exhaust gas analysis system include separate integrating circuits for each pollutant and limiting circuitry such that if the exhaust gas mixture, as sensed by any one of the pollutant detectors exceeds a preset norm by a given amount, then a more rapid correction process can be taken. If the pollutant output exceeds a second preset level, a signal will indicate this and the system can be checked for excessive pollutant output or system failure.

What is claimed is:

1. An electronic control system for controlling the duration of operation of repetitively activated equipment which produces repetitive signals, said electronic control system comprising:

means for sensing the values of a plurality of parameters which determine the duration of operation of the repetitively activated equipment;

means for producing a plurality of first signals representing said values;

means for operating on said first signals to produce a second signal representing the duration of operation of said repetitively activated equipment;

means for generating timing signals from the repetitive signals;

delay means for receiving said timing signals and for digitally shifting said timing signals therethrough at a rate determined by said second signal; and means, responsive to the time necessary for said timing signals to be shifted digitally through said delay means, for digitally generating (1) starting signals to activate said repetitively activated equipment and (2) terminating signals to deactivate said repetitively activated equipment, the duration of operation of said repetitively activated equipment thereby being controlled by said second signal.

2. An electronic control system for controlling the duration of operation of repetitively activated equipment which produces repetitive signals, said electronic control system comprising:

means for sensing the values of a plurality of parameters which determine the duration of operation of the repetitively activated equipment;

means for producing a plurality of first signals representing said values;

means for operating on said first signals to produce a second signal representing the duration of operation of said repetitively activated equipment;

means for generating timing signals from said repetitive signals;

delay means for receiving said timing signals and for digitally shifting said timing signals therethrough at a rate determined by said second signal;

first means for counting the number of timing signals received at the beginning of said delay means and for producing first control signals indicative of the number of counted timing signals received at said beginning;

second means for counting the number of timing signals arriving at the end of said delay means and for producing second control signals indicative of the number of counted timing signals arriving at said end, said second control signals being substantially delayed from said first control signals by the times necessary for said timing signals to be shifted digitally through said delay means; and means (1) responsive to said first control signals for producing starting signals to activate said repetitively activated equipment and (2) responsive to said second control signals for producing terminating signals to deactivate said repetitively activated equipment.

3. An electronic control system as in claim 2 and further including:

means for detecting the presence of timing signals received at said beginning and for transmitting third control signals to said first means to indicate the presence of each timing signal received at said beginning; and means for detecting the presence of timing signals arriving at said end and for transmitting fourth control signals to said second means to indicate the presence of each timing signal arriving at said end.

4. An electronic control system for controlling the duration of operation of repetitively activated equipment, wherein the repetitively activated equipment produces repetitive signals and wherein the repetitively activated equipment includes a plurality of repetitively activated means, said electronic control system comprising:

means for sensing the values of a plurality of parameters which determine the duration of operation of the repetitively activated equipment;

means for producing a plurality of first signals representing said values;

means for operating on said first signals to produce a second signal representing the duration of operation of said repetitively activated equipment;

means for generating timing signals from said repetitive signals;

delay means for receiving said timing signals and for digitally shifting said timing signals therethrough at a rate determined by said second signal;

first means for counting the number of timing signals received at the beginning of said delay means and for producing first control signals indicative of the number of counted timing signals received at said beginning;

second means for counting the number of timing signals arriving at the end of said delay means and for producing second control signals indicative of the number of counted timing signals arriving at said end, said second control signals being substantially delayed from said first control signals by the times necessary for said timing signals to be shifted digitally through said delay means; and means (1) responsive to said first control signals for sequentially selecting each of said repetitively activated means and for sending corresponding starting signals to activate each of the selected repetitively activated means and (2) responsive to said second control signals for sequentially selecting each of said repetitively activated means and for sending corresponding terminating signals to deactivate each of the selected repetitively activated means.

5. An electronic control system as in claim 4 and further including:

means for detecting the presence of timing signals received at said beginning and for transmitting thrid control signals to said first means to indicate the presence of each timing signal received at said beginning; and means for detecting the presence of timing signals arriving at said end and for transmitting fourth control signals to said second means to indicate the presence of each timing signal arriving at said end.

* * * * *